Sept. 29, 1953  F. X. LAMB  2,654,070
SEALED INSTRUMENT
Filed April 7, 1948  2 Sheets-Sheet 1
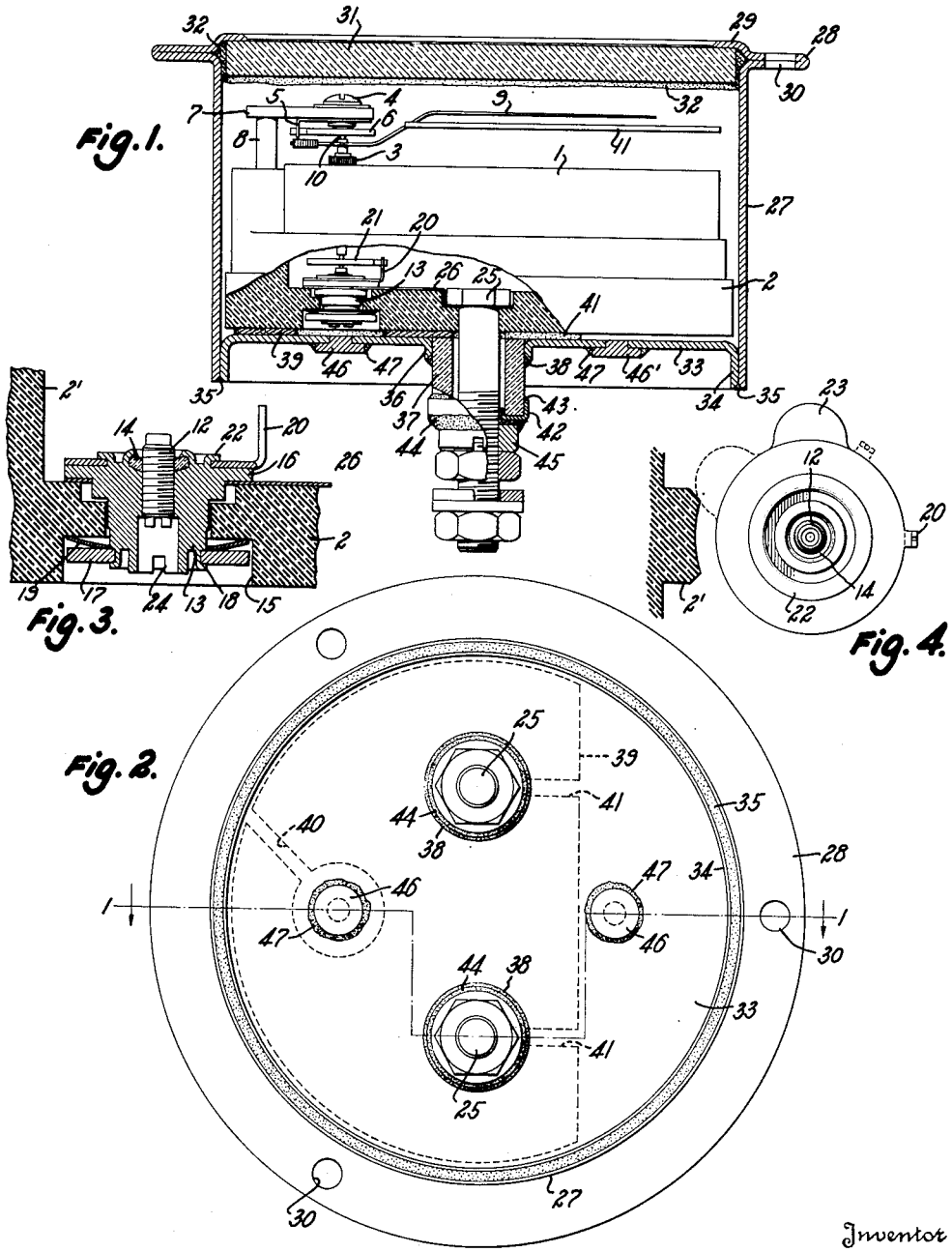
Inventor
Francis X. Lamb,
By
Pierce, Scheffler & Parker,
Attorneys Sept. 29, 1953     F. X. LAMB     2,654,070
SEALED INSTRUMENT
Filed April 7, 1948     2 Sheets-Sheet 2
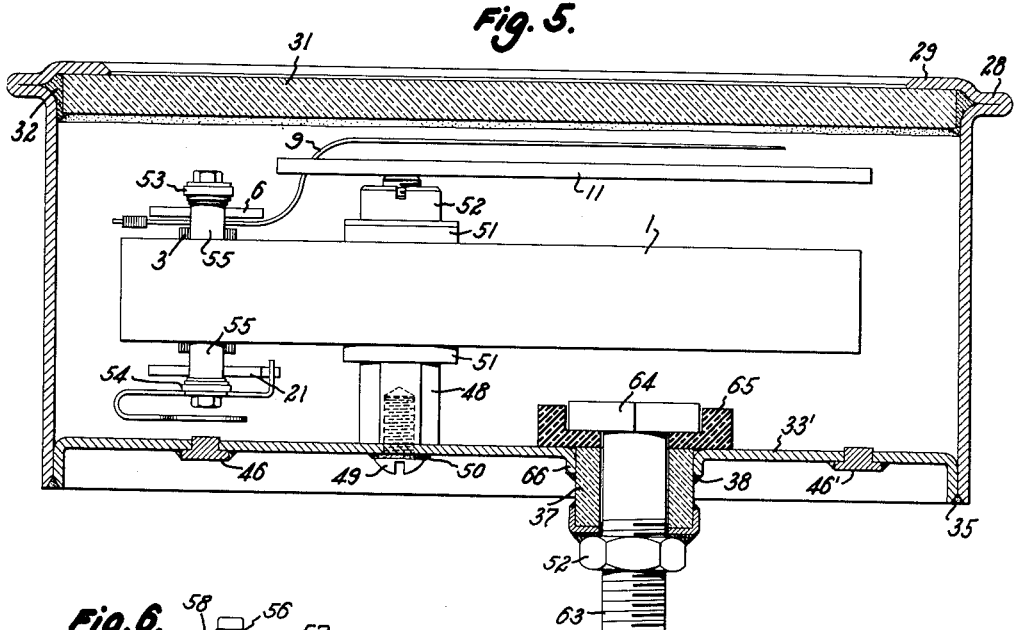
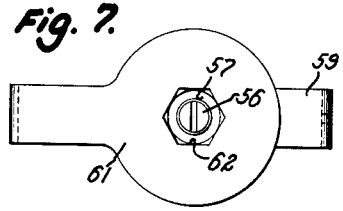
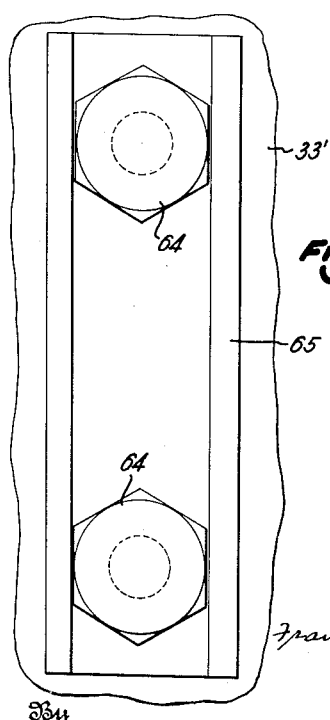
Inventor:
Francis X. Lamb,
By
Pierce, Scheffler & Parker,
Attorneys.

Patented Sept. 29, 1953

2,654,070

UNITED STATES PATENT OFFICE 2,654,070

SEALED INSTRUMENT

Francis X. Lamb, East Orange, N. J., assignor to Weston Electrical Instrument Corporation, Newark, N. J., a corporation of New Jersey Application April 7, 1948, Serial No. 19,525

13 Claims. (Cl. 324—155)

This invention relates to hermetically sealed measuring instruments and in particular to those of the electrical measuring type.

It is known that it is desirable to enclose the mechanism of electrical instruments in hermetically sealed casings to prevent damage to the instruments, and especially of measuring instruments and relays of high sensitivity, which are to be used in high humidity climates, in atmospheres heavily laden with injurious chemicals, gases or dust, and/or where exposed to the weather or immersed in liquids or gases. In addition to actual damage to the instrument from high humidity, injurious chemicals or dust, the instruments in inadequately sealed casings may be rendered substantially inoperative from time to time by fog or "dew" forming on the cover glass when subjected to extremes of, or to too sudden changes in, temperature and/or humidity. The sealing of the casing joints with waxes and greases does not afford a sufficient protection since the waxes fail at high temperatures and the greases are porous and can not prevent seepage and an introduction of moisture.

The general object of this invention is to provide improved casing constructions for hermetically sealing the instrument mechanism. Another object is to provide instrument constructions which permit the removal of the instrument mechanism as a complete unit from the hermetically sealed casing, thereby simplifying repairs, inspection and assembly of the instrument parts. Another object is to provide an improved construction for a hermetically sealed instrument which simplifies adjustment of the zero corrector and/or of the bearings of the instrument's moving system. Another object is to provide an improved arrangement for removing the air from an instrument casing which is to be hermetically sealed.

These and other objects and advantages of the invention will become apparent from the following description when considered with the accompanying drawings in which:

Fig. 1 is a sectional elevation of an encased instrument embodying the invention, the section being substantially on line 1—1 of Fig. 2;

Fig. 2 is a rear view of the instrument casing;

Fig. 3 is a fragmentary section, on an enlarged scale, through the lower (rear) jewel bearing, the zero corrector and the adjacent portions of the instrument base;

Fig. 4 is a fragmentary plan view of the same;

Fig. 5 is a side elevation of another embodiment of the invention, the casing being shown in substantially central section;

Fig. 6 is a side elevation, on an enlarged scale and with parts in section, of the lower (rear) jewel bearing and adjustable spring abutment;

Fig. 7 is an elevation of the same as viewed from below; and

Fig. 8 is a fragmentary view of the inner ends of the instrument terminals and the insulating strip which restrains angular movement thereof.

The electrical instrument per se of the embodiment illustrated in Figs. 1 to 4 includes a permanent magnet 1 secured to a base 2 of insulating material and having an interpolar gap in which a coil 3 is supported for pivotal movement. The upper jewel bearing for coil 3 is secured within a bushing 4 which, with the abutment 5 for the upper spring 6, is carried by and angularly adjustable in a bridge 7 supported by posts 8 mounted in the upwardly extending projection 2' of the insulating base 2. A pointer 9 is secured to the upper staff 10 of the coil 3, and is moved by the coil over a graduated scale, not shown, on the scale plate 11.

The several parts as above described are or may be of conventional design and construction. In accordance with this invention, the lower jewel bearing and the associated parts which support the jewel bearing are so constructed and arranged as to permit adjustment of jewels with respect to the coil staffs, and adjustment of the "zero" pointer position. It is to be understood that the terms "upper" and "lower" have reference to the relative location of the jewel bearings when the instrument base 2 is horizontal as shown in Fig. 1, and that such terms are employed for convenience and clarity in preference to the more general terms "front" and "rear" respectively which indicate the relative arrangement of the jewel bearings for any arbitrary angular arrangement of the electrical instrument.

The lower jewel (not shown) is mounted in a sleeve or screw 12 threaded into a bushing 13 and through a fibre lock washer 14 of conventional form secured within the bushing. The lower end of screw 12 has a kerf to receive a screw driver or other tool by which the jewel screw may be rotated. The bushing 13 is secured within a radially stepped bore 15 of base 2 by its upper flange 16 and a washer 17, the latter being secured to the lower end of bushing 13 by a spun or staked flange 18 and bearing against a spring washer 19. The abutment 20 for the lower coil spring 21 is anchored to the bushing 13 by the staked flange 22, and rotation of the bushing 13 in the bore 15 of base 2 therefore provides a zero correction or adjustment of the pointer 9. The range of zero correction is limited to an angular adjustment of the spring abutment 20 through an angle of about 300° by the lobe 23 which projects outwardly from the upper flange 16 of bushing 13 to contact one edge or the other of the vertical projection 2' of the insulating base 2. The lower end of bushing 13 is provided with a kerf 24 for receiving the end of a screw driver or other tool.

The electrical connections to the coil 3 are established through terminal studs or screws 25 which extend through the base 2 and have non-circular heads snugly fitted in correspondingly shaped recesses in the upper face of the base 2. As shown in Figs. 1 and 3, the ends of a conductive strap 26 are seated beneath the head of one terminal stud 25 and the flange 16 of the bushing 13 to complete an electrical circuit to the lower spring 21 to which an end of coil 3 is connected. The electrical circuit between the other terminal stud and the upper spring 6 is made in conventional manner.

The casing for enclosing the electrical instrument takes the form of a cylindrical metal sleeve 27 which is reversely bent at its upper end to provide outwardly and inwardly projecting radial flanges 28, 29 respectively. The outer flange 28 has openings 30 to receive screws or bolts for securing the casing to an instrument panel. A cover glass 31 is seated against the inner face of the flange 29, and is sealed to the casing by solder 32 which fills the annular space between the casing and the periphery of the glass 31. The opposite end of the cylindrical casing is closed by a metal plate 33 with a rearwardly projecting cylindrical flange 34 which fits within the end of the casing sleeve 27. The adjacent end faces of the sleeve 27 and flange 34 are beveled to form a groove into which solder 35 is run to seal the end plate to the casing sleeve. The melted solder feeds into the interior of the joint by capillary attraction to form a very effective hermetic seal.

The end plate 33 is provided with a pair of flanged openings 36 to pass the terminal studs 25, and insulating bushings 37, preferably of glass, are seated in the openings and sealed to the flanges thereof by solder 38. A sheet 39 of resilient material such as felt, natural rubber or synthetic rubber, is arranged between the instrument base 2 and the inner face of the end plate 33, the sheet having slots 40, 41 extending from its outer edge to openings beneath the zero adjuster bushing 13 and around the terminal studs 25, respectively. A cap washer 42 is fitted over the outer end of each glass bushing 37, and the cylindrical ends of the cap washers are sealed to the bushings by solder 43. A washer 44 made of soldering alloy is arranged between each cap washer and a clamp nut 45 which is threaded upon the associated terminal stud 25. In the assembly of the instrument on the end plate, the washers 44 are heated by a soldering iron and, as the washers melt, the nuts 45 are turned down to seat the instrument base firmly on the resilient layer 39. The soldering alloy seals the terminal studs to the cap washer 42 and also to the clamp nuts.

The end plate 33 is also provided with two relatively small openings in which plugs 46, 46' are inserted and sealed by solder 47 as the final step in the hermetic sealing of the casing. The opening for plug 46 is axially alined with the jewel screw 12 and zero corrector bushing 13, and the opening is of sufficient size to admit a small screw driver for adjustment of the jewel screw and of a somewhat larger screw driver for adjustment of the zero corrector. These adjustments may be made just prior to the sealing of the casing by the plugs 46, 46'. Dry air is blown through the casing to remove moisture, and this may be followed, if desired, by an inert gas. The slots 40, 41 in the resilient sheet 39 prevent the trapping of moist air around the zero corrector and the terminals during these operations. The dry air or gas may be sealed within the casing at pressures above or below atmospheric through the use of apparatus, not shown, for inserting and soldering the plugs 46, 46' without breaking the connections to the air or gas pump.

The hermetic sealing of the casing is completed by the soldered plugs 46, 46', and no dust, gases or moisture can get inside to damage the bearings, cause corrosion or develop fogging of the cover glass. In the event of shocks or rough handling which develops an error in the zero position of the pointer, the plug 46 may be removed after the solder 47 is melted, and the zero corrector bushing 13 may be adjusted by inserting a screw driver through the opening in the end plate. The casing is sealed again by inserting the plug 46 and soldering it to the rear plate. This zero correction may be effected by the instrument user but it is preferable to return the sealed instrument to the factory for inspection, adjustment or repair, and re-sealing under controlled conditions since a substantial error in the zero pointer position is frequently indicative of a damage or defect which can not be completely eliminated by adjustment of the zero corrector. The described construction has the advantage that the instrument can be readily removed, as a complete unit mounted on the end wall 33, for inspection and repair by melting the solder seal 35 between the casing sleeve 27 and the end wall 33. This seal-melting operation may be carried out conveniently by placing the sealed instrument upon an electrically heated "hot plate" which is apertured to pass the instrument terminals 25 and the insulating bushings 37, by localized heating such as obtained by high frequency induction, and by other means.

The measuring instrument of the embodiment of the invention which is illustrated in Figs. 5 to 8 is similar, in general, to the instrument of Figs. 1 to 4, and such parts as are or may be of identical construction are identified by the corresponding reference numerals but will not be described in detail. The measuring instrument of Figs. 5 to 8 is mounted directly upon the metal end wall 33', the permanent magnet 1 being supported upon and spaced from the end wall by studs 48. The lower ends of the studs are secured to the end wall by screws 49 having heads which are sealed to the end wall by solder 50. The studs 48 extend through openings in the legs of the magnet, and are insulated from the magnet by washers or bushings 51 of insulating material. The magnet 1 is rigidly mounted upon the studs by nuts 52 on the upper threaded ends of the studs. Upper and lower bridges 53, 54 respectively for supporting the jewel bearings of moving coil 3 are secured to the permanent magnet 1, or to the soft iron pole pieces, not shown, of the magnetic system by posts 55. The upper jewel bearing and associated elements may be of conventional form and, for simplicity of illustration, are not shown in Fig. 5.

The lower jewel is mounted in a jewel screw 56 threaded into a zero corrector bushing 57 and restrained against inadvertent movement by a fiber lock washer 58. The bushing 57 is journalled in the lower bridge 54 and has an upper radial flange which bears against the bridge. The lower end of the bushing projects through a coned resilient washer 58 and a spring abutment 59 which is anchored to the bushing by a staked or spun flange 60 of the same. The spring abutment has a reversely bent extension 61 with a non-circular opening 62 in axial alinement with the jewel screw 56 for receiving a correspondingly shaped tool by which the abutment and bushing 57 may be adjusted angularly against the frictional resistance imposed by the resilient washer 58. The end of a smaller tool or screw driver may be passed through the opening 62 for adjustment of the jewel screw 56.

The instrument terminal studs 63 have non-circular heads 64 which fit within the grooved upper surface of insulating strips 65 at the inner surface of the end wall 33'. The terminal studs extend through flanged openings 66 in the wall, and insulating bushings 37 which are sealed to the end wall of the casing by solder 38. The outer ends of the bushings 37 are sealed off in the same manner as described above with respect to the sealed instrument of Figs. 1 to 4. The end wall 33' has a pair of openings which are sealed, after the final test or adjustment of the instrument, by plugs 46, 46' respectively. The opening for plug 46 is of course in axial alinement with the jewel screw 56 to permit adjustment of the bearings and/or of the zero corrector upon removal of the plug 46.

The method of assembly and subsequent adjustment, inspection or repair of this embodiment of the invention will be apparent from the above discussion of the embodiment shown in Figs. 1 to 4 inclusive.

It is to be understood that the invention is not limited to the illustrated measuring instrument since the same principles may be applied to instruments and instrument type relays having other types of cooperating field structures and moving systems, for example to iron vane instruments, ratio meters, power and frequency meters, and various types of electrodynamometer instruments.

I claim:

1. A hermetically sealed electrical instrument comprising the combination with a cylindrical metallic housing, and a glass window solder-sealed across the front end of the housing; of an end wall of metal extending across the rear end of and solder sealed to said housing, and an electrical measuring instrument rigidly secured to said metal end wall for insertion into and removal from said housing as a unit with said metal end wall, said metal end wall being provided with a plurality of openings therethrough, threaded terminal studs for said instrument projecting through and spaced from the edges of certain of said openings, means extending across the other openings and soldered to said metal end wall to seal the same, means insulating said terminal studs from said end wall and including ceramic insulating bushings surrounding said terminal studs at the exterior of the casing, means including said bushings and clamp nuts threaded upon said terminal studs for rigidly securing the same to said end wall, and solder hermetically sealing the opposite ends of said bushings to said end wall and terminal studs respectively.

2. A hermetically sealed electrical instrument as recited in claim 1, wherein said terminal studs have heads of non-circular cross-section, and said insulating means includes rigid insulating material between said heads and the inner face of said metal end wall, said rigid insulating material having recesses receiving said heads and cooperating therewith to prevent rotation of said terminal studs.

3. A hermetically sealed electrical instrument as recited in claim 2, wherein said electrical instrument includes a base of insulating material constituting the rigid insulating material having recesses for receiving the heads of said terminal studs.

4. A hermetically sealed electrical instrument as recited in claim 2, wherein said rigid insulating material comprises a strip of material; and said electrical instrument includes a field structure and moving system, means including screws extending through said end wall for supporting said field structure thereon, and solder sealing said screws to said end wall.

5. A hermetically sealed electrical instrument as recited in claim 1, wherein said end wall has a peripheral flange and is telescoped within said casing, the adjacent end surfaces of said flange and casing being beveled to provide an annular recess, and solder in said recess and between the flange and casing to form a hermetic seal.

6. In a hermetically sealed electrical instrument, the combination with a metal casing sleeve, an end wall of metal secured and sealed to one end of said casing sleeve by solder, said end wall having openings therethrough, and an end closure secured and sealed to the other end of said casing sleeve by solder, of an electrical instrument supported on said end wall and movable therewith into and out of said metal casing sleeve, said instrument including a field structure and a moving system, means including a jewel bearing supported in a zero corrector bushing mounting said moving system for angular movement about an axis normal to said end wall, said bushing being axially alined with and accessible for adjustment through one of said end wall openings, a plug seated in said one opening and soldered to said end wall to seal the opening, instrument terminals extending through other rear wall openings, and insulating means soldered to said end wall and said terminals to seal said other end wall openings.

7. In a hermetically sealed electrical instrument, the invention as recited in claim 6, wherein said jewel bearing is mounted in a jewel screw threaded into said zero corrector bushing, whereby said jewel screw is also accessible for adjustment upon removal of said sealing plug.

8. In a hermetically sealed electrical instrument, the invention as recited in claim 6, wherein there are two spaced openings in which sealing plugs are inserted and soldered, whereby a stream of dry gas may be passed through the casing to remove moisture therefrom before the said plugs are inserted and soldered.

9. In a hermetically sealed electrical instrument, the invention as recited in claim 6, wherein said electrical instrument includes a base of insulating material through which said terminal studs extend and upon which said field structure is mounted, and the means sealing the openings through which said terminal studs extend includes nuts threaded upon the same to clamp said insulating base to said end wall.

10. In a hermetically sealed electrical instrument, the invention as recited in claim 9, wherein a sheet of resilient material is arranged between the insulating base and the end wall, the sheet having openings therethrough in alinement with said zero corrector bushing and around said terminal studs, and slots extending from the periphery of said sheet to said openings of the sheet of resilient material.

11. In a hermetically sealed electrical instrument, the invention as recited in claim 9, wherein said zero corrector bushing is mounted in a radially stepped opening through said insulating material base.

12. In a hermetically sealed electrical instrument, the invention as recited in claim 6, wherein a spring abutment is secured to said zero corrector bushing, and a coil spring is connected between said spring abutment and said moving system, said spring abutment having a reversely bent extension with a non-circular opening therethrough in axial alinement with the zero corrector bushing.

13. In a hermetically sealed electrical instrument, the invention as recited in claim 6, wherein studs secured to said end wall support said field structure therefrom, and said means mounting the moving system includes bridges supported by said field structure, said zero corrector bushing being supported by and angularly adjustable with respect to one of said bridges.

FRANCIS X. LAMB.

References Cited in the file of this patent

UNITED STATES PATENTS

| Number | Name | Date |
|---|---|---|
| 807,434 | Bradshaw | Dec. 19, 1905 |
| 1,945,456 | Wardenburg | Jan. 30, 1934 |
| 2,137,069 | Vatter | Nov. 15, 1938 |
| 2,171,183 | Lamb | Aug. 29, 1939 |
| 2,210,699 | Bahls | Aug. 6, 1940 |
| 2,212,232 | Helgeby | Aug. 20, 1940 |
| 2,320,946 | Madden | June 1, 1943 |
| 2,346,572 | Goodwin | Apr. 11, 1944 |
| 2,413,414 | Obermaier | Dec. 31, 1946 |
| 2,426,800 | Triplett | Sept. 2, 1947 |
| 2,463,844 | Anderson | Mar. 8, 1949 |

OTHER REFERENCES

Publication "Instruments," vol. 18, July 1945, page A 35 (advertisements).